United States Patent [19]

Lee, deceased et al.

[11] 4,374,951

[45] Feb. 22, 1983

[54] POLYBLENDS COMPRISING N-PHENYLMALEIMIDE COPOLYMERS AND SAN COPOLYMERS

[75] Inventors: Yoon C. Lee, deceased, late of Springfield, Mass., by Nancy J. Lee, administratrix; Gary L. Deets; Quirino A. Trementozzi, both of Springfield, Mass.

[73] Assignee: Monsanto Company, St. Louis, Mo.

[21] Appl. No.: 301,333

[22] Filed: Sep. 11, 1981

[51] Int. Cl.³ .................... C08L 33/24; C08L 51/04; C08L 25/12

[52] U.S. Cl. ...................................... 525/73; 525/205

[58] Field of Search ................................. 525/205, 73

[56] References Cited

U.S. PATENT DOCUMENTS

| | | | |
|---|---|---|---|
| 3,642,949 | 2/1972 | Stafford et al. | 260/876 |
| 3,652,726 | 3/1972 | Nield et al. | 260/876 |
| 3,721,724 | 3/1973 | Uebele et al. | 260/880 R |
| 3,998,907 | 12/1976 | DiGiulio | 260/857 L |
| 4,127,617 | 11/1978 | Arrighetti et al. | 260/878 R |

*Primary Examiner*—Carman J. Seccuro
*Attorney, Agent, or Firm*—William J. Farrington; Paul D. Matukaitis; Arnold H. Cole

[57] ABSTRACT

Polyblends of N-phenyl maleimide copolymers and SAN copolymers within certain imide and acrylonitrile content ranges are found to have unique compatibility properties not displayed by related copolymer blends.

5 Claims, No Drawings

4,374,951

POLYBLENDS COMPRISING N-PHENYLMALEIMIDE COPOLYMERS AND SAN COPOLYMERS

BACKGROUND OF THE INVENTION

This relates to polyblends and specifically to blends of an ABS-type polymer with a copolymer of N-phenyl maleimide.

When a single polymer is incapable of providing the desired blend of properties a common solution is to blend polymers with the appropriate properties. While this approach is broadly acceptable, for some properties such as impact strength it is important that the polymers be compatible. In a blend of two crystal polymers, this means that there is no tendency for the two to separate as the blend is heated. Where one of the polymers is rubber-modified and comprises grafted rubber particles dispersed in a matrix polymer, the matrix polymer is the component that needs to be compatible with the blended polymer.

Compatibility is best followed using the technique of differential scan calorimetry to measure the glass transition temperature (Tg) of the blend. A compatible blend will show a single value for Tg whereas a less than compatible blend shows two or more Tg values, corresponding to the components in the mixture.

This invention relates to compatible polyblends and by this term is indicated polyblends displaying a single Tg for the polyblend matrix.

DISCUSSION OF THE PRIOR ART

Blends of ABS with copolymers containing 5 to 35% by weight of maleimide or N-alkyl maleimide are described in U.S. Pat. No. 3,642,949 and blends of ABS with a resin containing 1-50% by weight each of acrylonitrile and an N-aryl maleimide, and 1-95% of an aromatic olefin are described in U.S. Pat. No. 3,652,726.

Rubber modified copolymers of styrene, acrylonitrile and maleimide or various substituted maleimides are described in U.S. Pat. No. 3,721,724.

None of the above however describe blends in which matrix polymers display compatibility as evidenced by a single glass transition temperature measured on a differential scan calorimeter.

A narrow range of blends has now been identified that shows complete compatibility and consequently enhanced properties.

DESCRIPTION OF THE INVENTION

The polyblends of the present invention comprise

A. a copolymer having from 40 to 55% by weight of N-phenyl maleimide, from 0 to 10% by weight of acrylonitrile and from 35 to 60% by weight of a vinylaromatic monomer; and B. a copolymer of a vinylaromatic monomer and from 20 to 40% by weight of acrylonitrile.

The proportions of Components A and B can vary with respect to one another without significantly affecting their compatibility but in general the weight ratio of A to B is from 10:1 to 1:10 and preferably 4:1 to 1:4.

The polyblend may comprise other components dispersed in the polyblend and typically these would include a rubber grafted with a copolymer of essentially the same composition as either of components A and B or two such grafted rubbers. Such polyblends would be formed by blending together either or both of Components A and B in the "rubber-modified" forms. These are usually formed by polymerizing the monomers in the presence of the rubber and comprise a matrix polymer of the copolymerized monomers and, dispersed therein, particles of the rubber grafted with a graft copolymer of the same monomers that provide the matrix polymer.

The vinylaromatic monomer of both Components A and B is conveniently styrene though this can be substituted, in whole or in part, in either or in both, by any of the commonly known equivalents such as α-methyl styrene, p-methyl styrene, vinyl toluene, chlorostyrene and bromostyrene.

Where either component is present in the rubber modified form this can be present in an amount to provide from 2 to 50% of the polyblend weight though amounts of from 10 to 30% are more usual.

The rubber modifier, where present, is conveniently a rubber having a glass transition temperature below 0° C. and preferably below about −30° C. Suitable rubbers include diene based rubbers such as polybutadiene, polyisoprene and polychloroprene; copolymers of a diene with minor amounts of styrene, acrylonitrile and/or other copolymerizable monomers; acrylate rubbers; polypentenamer and EPDM rubbers.

The polyblend can also comprise fillers, antioxidants, stabilizers, plasticizers, pigments and the like conventional property enhancing additives if so desired.

DESCRIPTION OF PREFERRED EMBODIMENTS

The preferred polyblends of the invention comprise an ABS terpolymer, in which the matrix SAN copolymer has from 20 to 35% of acrylonitrile, with a rubber modified copolymer of styrene with N-phenyl maleimide wherein the matrix copolymer comprises from 40 to 50% by weight of the N-phenyl maleimide. The proportions of the ABS and the rubber-modified N-phenyl maleimide copolymer are preferably from 10:90 to 40:60.

Other preferred polyblends comprise ABS blended with a crystal (non-rubber modified) styrene/N-phenyl maleimide copolymer in proportions of 60:40 to 30:70. The preferred ranges for AN content of the ABS matrix polymer and the N-phenyl maleimide content of the crystal copolymer recited above also apply to the blends.

The N-phenyl maleimide copolymer preferably has an inherent viscosity of at least 0.3. The temperature at which the polymer is formed is found to have a surprising and profound effect on the inherent viscosity. In general polymerization temperatures of below 80° C. are found to be necessary to achieve this level of inherent viscosity.

EXAMPLES 1–8

The invention is further illustrated by the following Examples in which various ABS or SAN polymers are blended with crystal and rubber modified styrene/N-phenyl maleimide copolymers. The various ABS or SAN components used are identified in Table 1.

TABLE 1

| | % Rubber | % Matrix SAN | (ABS/SAN Components) % AN in Matrix |
|---|---|---|---|
| ABS-1 | 12% | 80% approx. | 18% |
| ABS-2 | 40% | 50% approx. | 27% |
| SAN-1 | — | 100% | 23% |

TABLE 1-continued

| | % Rubber | % Matrix SAN | (ABS/SAN Components) % AN in Matrix |
|---|---|---|---|
| SAN-2 | — | 100% | 42% |

These components were blended with various imide copolymers and the proportions and results of compatibility testing are given below in Table 2. "Yes" indicates that the blend showed a single Tg for the combined matrix when tested using a differential scan calorimeter. This shows compatibility of the matrices. "No" indicates that two Tg values were obtained and thus draws the inference of incompatibility. Those polymers designated "PMI" are N-phenyl maleimide polymers; those designated "MI" are maleimide polymers; and those designated "MMI" are N-methyl maleimide polymers.

The blends are all in 50/50 by weight proportions. The composition of each imide copolymer is given in percentage by weight. It should be noted that the values approximate 30–35% molar for each imide component such that the data points are comparable.

From the Table it will be seen that imide polymers comprising more than about 10% of acrylonitrile are generally incompatible unless the SAN component is likewise very high in AN content. It will also be noted that the N-methyl maleimide and maleimide copolymers showed no compatibility with any of the SAN or ABS polymers, unlike the N-phenyl maleimide polymers for which limited regions of compatibility can be defined. This is a quite unexpected result and indicates the unique character of such blends.

To evaluate the influence of compatibility on the critical impact strength various blends were prepared from crystal and rubber-modified N-phenyl maleimide polymers blended with various ABS polymers in various proportions. The polymers used are described in Table 3 below.

TABLE 3

(Polymers blended)

A. Imide Polymers

| Polymer | % Rubber | % N—phenyl maleimide in matrix polymer | % Matrix Polymer |
|---|---|---|---|
| IPMI-6 | 0 | 47 (7% AN) | 100 |
| IPMI-3 | 0 | 48 (0% AN) | 100 |
| PMI-4 (c) | 0 | 46 (19% AN) | 100 |
| PMI-5 (c) | 0 | 44 (23% AN) | 100 |
| PMIR-1 | 15 | 50 | 68 |
| PMIR-1* (Recrystallized) | 15 | 50 | 68 |
| PMIR-2 | 15 | 43 | 65 |

B. ABS Polymers

| | % Rubber | % AN in matrix polymer | % Matrix Polymer |
|---|---|---|---|
| ABS-2 | 40% | 27 | 50 (approx.) |
| ABS-3 | 12% | 31 | 75 |
| ABS-4 | 12% | 31 | 75 |
| ABS-5 | 12% | 31 | 75 |

The properties of the polyblends clearly show the advantages of compatibility in terms of their impact strengths. This is illustrated by the data presented in Table 4 in which various blends are compared.

TABLE 2

(Blend Compatibility)

| EXAMPLE | Imide Polymer. | S (%) | Imide (%) | AN (%) | ABS-1 (18% AN) | ABS-2 (27% AN) | SAN-1 (23% AN) | SAN-2 (42% AN) |
|---|---|---|---|---|---|---|---|---|
| 1 | PMI-1 | 54 | 46 | — | — | Yes | Yes | No |
| 2 | PMI-2 | 50 | 50 | — | — | Yes | Yes | No |
| 3 | PMI-3 | 44 | 48 | 7 | No | Yes | Yes | Yes |
| Comp-1 | PMI-4 | 35 | 46 | 19 | No | No | No | Yes |
| Comp-2 | PMI-5 | 33 | 44 | 23 | — | No | No | Yes |
| 4 | PMI-6 | 53 | 47 | — | No | Yes | Yes | No |
| 5 | PMI-7 | 60 | 40 | — | — | Yes | Yes | No |
| Comp-3 | PMI-8 | 65 | 35 | — | — | No | No | No |
| Comp-4 | MI-1 | 69 | 31 | — | — | No | No | No |
| Comp-5 | MI-2 | 60 | 32 | 8 | — | No | No | No |
| Comp-6 | MI-3 | 58 | 27 | 15 | — | No | No | No |
| Comp-7 | MMI-1 | 65 | 35 | — | — | No | No | No |
| Comp-8 | MMI-2 | 59 | 32 | 9 | — | No | No | No |
| Comp-9 | MMI-3 | 49 | 34 | 17 | — | No | No | No |

TABLE 4

(Blend Properties)

| Imide Polymer | Weight of imide polymer (% total) | Weight of ABS (% total) | | | | (1) DTUL (°C.) | (2) Izod. (ft.lb./ inch notch) |
|---|---|---|---|---|---|---|---|
| | | ABS-2 | ABS-3 | ABS-4 | ABS-5 | | |
| PMI-6 | 47 | 31 | | 21 | | 121 | 1.5 |
| PMI-3 | 48 | 31 | | 21 | | 126 | 1.2 |
| PMI-4 | 46 | 31 | | 21 | | 126 | 0.9 |
| PMI-5 | 44 | 31 | | 21 | | 101 | 0.9 |
| PMIR-1 | 90 | | | 10 | | 146 | 0.5 |
| PMIR-1 | 75 | | | 25 | | 128 | 0.7 |
| PMIR-1 | 75 | | 25 | | | 130 | 1.7 |
| PMIR-1 | 75 | | | | 25 | 127 | 1.1 |
| PMIR*-1 | 75 | | 25 | | | 145 | 2.0 |
| PMIR*-1 | 85 | | | | 15 | 151 | 1.5 |
| PMIR-2 | 75 | 25 | | | | 132 | 0.5 |
| PMIR-2 | 75 | | 25 | | | 146 | 1.6 |

(1) Measured using the method of ASTM D-648
(2) Measured using the method of ASTM D-256

PMI-4 and 5 are outside the definition of suitable Components A for use in the invention. As can be seen the lack of compatibility is reflected in a substantial drop in the Izod impact strength by comparison with the PMI-6 & 3 blends which are within the invention.

EXAMPLES 9–15

These Examples illustrate the surprising effect of temperature on the styrene/N-phenyl maleimide viscosity and the advantageous polymers that can be obtained if the reaction is conducted under appropriate conditions.

Table 5 below illustrates the reaction conditions used to obtain a series of PMI copolymers and correlates these with the inherent viscosity ($\eta$inh) of the copolymer.

TABLE 5

| Polymer | % Styrene (by wt.) | % PMI (by wt.) | Cycle (hours) | Temp. | Target Solids | Catalyst* | $\eta$inh | HDTUL |
|---|---|---|---|---|---|---|---|---|
| PMI-1 | 54 | 46 | 5.5 | 105° C. | 22.2% | TBPA/TBPO | 0.26 | 163° C. |
| PMI-2 | 50 | 50 | 7.5 | 90° C. | 20% | TBPO | 0.23 | — |
| PMI-6 | 53 | 47 | 10 | 75° C. | 25% | TBPO | 0.35 | 163° C. |
| PMI-9 | 50 | 40 | 10 | 75 | 40.8% | TBPO | 0.36 | 173° C. |
| PMI-10 | 50 | 50 | 10 | 75 | 38.8% | TBPO | 0.35 | 175° C. |
| PMI-11 | 54 | 46 | 5.5 | 105 | 41.4 | TBPA/TBPO | 0.26 | — |

*TBPO is tertiary butyl proctoate,
TBPA is tertiary butyl peracetate. Total catalyst was 0.15 parts per 100 parts of monomer. Mixed catalysts had 0.06 pts of TBPA + 0.9 parts of TBPO. From a comparison of PMI-1 with PMI-11 it is clear that, surprisingly, the % conversion (quoted as target solids in Table 5) does not affect the inherent viscosity. Also surprising is the discovery that the viscosity is strongly dependent on the polymerization temperature. In general it is found that polymers with an inherent viscosity over 0.3 need to be polymerized at a temperature below about 80° C.

What is claimed is:

1. A polyblend comprising:
   A. a copolymer having from 40 to 55% by weight of N-phenyl maleimide, from 0 to 10% by weight of acrylonitrile and from 35 to 60% by weight of a vinylaromatic monomer; and
   B. a copolymer of a vinyl aromatic monomer and from 20 to 40% by weight of acrylonitrile.

2. A polyblend according to claim 1 which also comprises dispersed particles of a rubber grafted with the monomers providing the copolymer of component A.

3. A polyblend according to claim 1 which also comprises dispersed particles of a rubber grafted with the monomers providing the copolymer of component B.

4. A polyblend according to any one of claims 1 to 3 which comprises components A and B in a weight ratio of from 10:1 to 1:10.

5. A polyblend according to any one of claims 1 to 3 in which component A has an inherent viscosity of at least 0.3.

* * * * *